United States Patent
Seliuchenko

(10) Patent No.: US 11,802,962 B2
(45) Date of Patent: Oct. 31, 2023

(54) METHOD FOR MULTIPATH ERROR COMPENSATION AND MULTIPATH ERROR-COMPENSATED INDIRECT TIME OF FLIGHT RANGE CALCULATION APPARATUS

(71) Applicant: Melexis Technologies NV, Tessenderlo (BE)

(72) Inventor: Volodymyr Seliuchenko, Nashua, NH (US)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 437 days.

(21) Appl. No.: 17/116,061

(22) Filed: Dec. 9, 2020

(65) Prior Publication Data

US 2021/0173087 A1    Jun. 10, 2021

(30) Foreign Application Priority Data

Dec. 10, 2019  (EP) ..................................... 19214971

(51) Int. Cl.
*G01S 17/32* (2020.01)
*G01S 17/931* (2020.01)
(Continued)

(52) U.S. Cl.
CPC ............ *G01S 17/32* (2013.01); *G01S 17/894* (2020.01); *G01S 17/931* (2020.01); *G06V 20/56* (2022.01)

(58) Field of Classification Search
None
See application file for complete search history.

(56) References Cited

U.S. PATENT DOCUMENTS 10,061,028 B2    8/2018 Koppal et al.
2013/0148102 A1  6/2013 Oggier
(Continued)

FOREIGN PATENT DOCUMENTS

WO    WO-2019210431 A1    11/2019

OTHER PUBLICATIONS

European Search Report for European Patent Application No. 19214971 dated Apr. 14, 2020.

*Primary Examiner* — Hovhannes Baghdasaryan
(74) *Attorney, Agent, or Firm* — Harness, Dickey & Pierce, P.L.C.

(57) ABSTRACT

A method for multipath error compensation comprises an unstructured light source (142) illuminating a scene during a plurality of consecutive time frames. A structured light source (144) illuminates the scene concurrently, the illumination by the structured source (144) occurring during predetermined frames of the plurality of consecutive time frames. An array of photodetectors (102) each generate a set of signals in response to irradiation with light reflected from the scene according to an indirect time of flight calculation technique to yield a plurality of sets of signals. An error estimate is derived (130) from the plurality of sets of signals generated during a selected time frame of the plurality of consecutive time frames when structured illumination takes place and another time frame temporally about the selected time frame when both structured and unstructured illumination takes place. The error estimate is applied in a range calculation with respect to the scene.

20 Claims, 4 Drawing Sheets

(51) Int. Cl.
    *G01S 17/894*    (2020.01)
    *G06V 20/56*    (2022.01)

(56) References Cited

U.S. PATENT DOCUMENTS

| | | |
|---|---|---|
| 2015/0253429 A1 | 9/2015 | Dorrington et al. |
| 2018/0080766 A1* | 3/2018 | Johnson .................. G01C 3/08 |
| 2018/0095165 A1 | 4/2018 | Cohen et al. |
| 2018/0210070 A1 | 7/2018 | Bleyer et al. |
| 2019/0051004 A1 | 2/2019 | He et al. |
| 2019/0068853 A1 | 2/2019 | Price et al. |
| 2019/0361099 A1* | 11/2019 | Satat ....................... G01S 7/487 |

* cited by examiner

METHOD FOR MULTIPATH ERROR COMPENSATION AND MULTIPATH ERROR-COMPENSATED INDIRECT TIME OF FLIGHT RANGE CALCULATION APPARATUS

FIELD

The present invention relates to a method for multipath error compensation for an indirect time of flight range calculation apparatus, the method being of the type that, for example, illuminates a scene with structured light. The present invention also relates to a multipath error-compensated indirect time of flight range calculation apparatus of the type that, for example, comprises a structured light source to illuminate a scene.

BACKGROUND

In so-called time-of-flight sensing systems and other systems, for example gaming console vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken, each sample being phase stepped by, for example, 90°. Using this illumination and sampling approach, a phase angle between illumination and reflection can be determined, and the determined phase angle can be used to determine a distance to the reflecting feature of the scene. In this respect, a typical iToF system comprises a buffer that stores analogue signals generated by a so-called photonic mixer device in respect of m phases employed for subsequent signal processing. A discrete Fourier transformation unit calculates a fundamental frequency output signal of a complex signal stored by the buffer in terms of in-phase and quadrature components of the signals. Using the values of the in-phase and quadrature components, a phase angle of the complex signal and the amplitude can be calculated and the distance to an object can be solved using the phase angle information.

In iToF systems, high frequency signal processing (demodulation) occurs at the pixel level, and so the signal bandwidth post-pixel required to integrate a large number of pixels on the same chip is low. Consequently, iToF systems can support a larger number of channels and hence higher spatial resolution measurement than direct ToF systems. However, iToF systems have limited distance measurement capabilities. In this regard, to achieve low stochastic distance measurement errors, iToF systems require high modulation frequencies, which in turn lowers the distance range that can be measured unambiguously. For example, a 100 MHz modulation frequency results in an approximate unambiguous measurement range of 1.5 m. Also, a conventional iToF system is susceptible to errors due to multiple reflections and multiple propagation paths.

To illustrate this, consider an automotive context where a scene comprising a vehicle being monitored by an iToF system, but the scene also comprises a wall and another object, for example a road sign. The distance to the vehicle measured by the iToF system is determined by light reflected directly from the vehicle, i.e. a true direct reflection. However, in such situations, light emitted can reach the vehicle and/or light reflected by the vehicle can reach the iToF system indirectly via reflection from the wall, leading to an erroneous measurement of the distance due to the increased optical path length and the iToF system being unable to discern the path of the emitted and/or reflected light. Additionally, the signal from a highly reflective road sign may get scattered by the optical system imperfections, thereby creating a stray optical signal received by the iToF system and again resulting in another erroneous measurement of the distance, which is actually the distance to the road sign.

Another possible source of multipath distance measurement error is the presence of multiple objects within a pixel of the iToF system's field of view. However, since iToF cameras typically have a high resolution, this kind of error is of lesser practical importance. Nevertheless, such a source of errors exists.

US 2015/253429 discloses a technique to reduce multipath errors and exploits the fact that the multipath errors typically have low spatial frequencies, since the multipath errors are very often caused by diffuse or semi-diffuse reflections that act as a spatial low pass filter. To compensate for such error sources, a scene is illuminated by a set of complementary patterns created using beam shaping optics, for example holographic diffusers, MicroElectroMechanical Systems (MEMS) mirror arrays or simply by masking.

For example, in an iTOF system employing the compensation technique of US 2015/253429, a frame acquisition consists of separate acquisition of 2 or more sub-frames using complementary checkerboard-like illumination patterns. In each sub-frame, an illuminated area receives an iTOF illumination optical signal $\vec{S}_{illuminated}$ from the light areas of the checkerboard-like pattern comprising a true (direct) optical echo signal, $\vec{O}_{gt}$ (ground truth), and a multipath component, $\vec{O}_{mp}$:

$$\vec{S}_{illuminated} = \vec{O}_{gt} + \vec{O}_{mp} \quad (1)$$

The signal in respect of the dark areas, $\vec{S}_{dark}$, of the checkerboard-like illumination pattern only comprises the multipath component, $\vec{O}_{mp}$:

$$\vec{S}_{dark} = \vec{O}_{mp} \quad (2)$$

This means that, over a single frame, the signal in respect of a given dark area, $\vec{S}_{dark}$, can be determined by illumination over the first sub-frame and a second sub-frame by a combination of the two respective complementary patterns. In order to measure the light reflected from an object in a scene, the first illumination pattern is used to illuminate the scene and reflections measured by a ToF camera over the first sub-frame using, for example, 4 offset phase angles in accordance with the indirect time of flight measurement technique. This yields multipath vectors, $\vec{O}_{mp}$, for the dark parts of the first illumination pattern. Thereafter, the scene is illuminated during the second sub-frame using the second complementary illumination pattern and reflections are measured by the ToF camera in a like manner to the measurement performed over the first sub-frame. A full "image" of $\vec{S}_{dark}$ vectors, i.e. a matrix of vectors corresponding to each pixel of the ToF camera. Thus, in such a method, 8 sample period, one for example phase offset applied in each sub-frame, are required to measure a reflected "ground truth" signal, $\vec{S}_{gt}$. US 2015/253429 also discloses other illumination patterns to minimise the number of samples periods required.

The use of complementary illumination patterns allows the illumination optical signal, $\vec{S}_{illuminated}$, over the duration of the whole frame to be reconstructed by exploiting the low spatial frequency property of the multipath error component. Consequently, the crosstalk-free ToF reflected signal, $\vec{S}_{gt}$, is approximated as:

$$\vec{S}_{gt} = \vec{S}_{illuminated} - \vec{S}_{dark} \quad (3)$$

This approach performs adequately in practice, but suffers from the disadvantage of reducing the distance frame rate by a factor of two or more as the number of complementary illumination patterns increases. Consequently, accuracy with which motion in a scene can be identified reduces.

US 2018/095165, US 2013/148102, U.S. Pat. No. 10,061,028, US2019/051004, US 2019/068853 disclose various techniques employing the illumination of a scene with different patterns of light.

SUMMARY

According to a first aspect of the present invention, there is provided a method for multipath error compensation for an indirect time of flight range calculation apparatus, the method comprising: an unstructured light source illuminating a scene during a plurality of consecutive time frames; a structured light source illuminating the scene concurrently with the illumination of the scene by the unstructured light source, the illumination by the structured light source occurring during predetermined frames of the plurality of consecutive time frames; an array of photodetectors generating a plurality of sets of signals in response to irradiation with light reflected from the scene, the plurality of sets of signals comprising a set of signals generated substantially contemporaneously by each photodetector element of the array of photodiodes in accordance with an indirect time of flight measurement technique; deriving an error estimate from the plurality of sets of signals generated during a selected time frame of the plurality of consecutive time frames and another time frame temporally about the selected time frame, illumination by the unstructured light source occurring during the selected time frame and illumination by both the structured and unstructured light sources occurring during the another time frame; and applying the error estimate in a range calculation with respect to the scene.

The array of photodiodes may generate the plurality of sets of signals during each of the plurality of consecutive time frames in synchronism with the illumination of the scene by the structured light sources and/or the unstructured light source received by the array of photodetectors.

The method may further comprise: updating the error estimate using the plurality of sets of signals generated during a subsequent selected frame of the plurality of consecutive time frames and a further time frame temporally about the subsequent selected time frame; illumination by the unstructured light source occurring during the subsequent selected time frame and illumination by both the structured and unstructured light sources may occur during the further time frame.

The predetermined time of the plurality of consecutive time frames may be non-consecutive. The non-consecutive predetermined frames may be regularly spaced in time.

The method may further comprise: deriving the error estimate by calculating a difference between respective measurements corresponding to the plurality of sets of signals of the selected time frame and respective measurements corresponding to the plurality of sets of signals of the another time frame.

Calculating the difference may comprise calculating a difference image frame between an image frame in respect of the plurality of sets of signals of the selected time frame and an image frame in respect of the plurality of sets of signals of the another time frame.

The structured light source may employ an illumination pattern comprising regions of no illumination; and the error estimate may be derived in respect of the regions of no illumination.

The error estimate may be derived using regions of the difference calculated corresponding to regions of no illumination of the illumination pattern of the structured light source.

The method may further comprise: storing measurements of the difference image frame corresponding to the regions of no illumination.

The first unstructured light source and the structured light source may share a substantially common field-of-illumination.

The unstructured light source may emit a uniform pattern of illumination. The uniform pattern of illumination may be in respect of the scene within a field of view of the array of photodetectors.

The difference calculated may comprise error measurements in respect of the regions of no illumination of the illumination pattern of the structured light source; and derivation of the error estimate may comprise: interpolating using the measurements corresponding to the regions of no illumination of the illumination pattern of the structured light source in order to obtain error measurements in respect of regions of illumination of the illumination pattern of the structured light source.

The method may further comprise: scaling measurements of the calculated difference in respect of the regions of no illumination.

The method may further comprise: another structured light source illuminating the scene concurrently with the illumination of the scene by the unstructured light source; the illumination by the another structured light source may occur during further predetermined time frames of the plurality of consecutive time frames different from the predetermined time frame; and derivation of the error estimate may further comprise employing the plurality of sets of signals generated during another selected time frame of the further predetermined time frames; illumination by the another unstructured light source may occur during the another selected time frame.

The structured light source may comprise a first illumination pattern. The another structured light source may comprise a second illumination pattern; the second illumination pattern may be different to the first illumination pattern.

According to a second aspect of the invention, there is provided a multipath error-compensated indirect time of flight range calculation apparatus comprising: an unstructured light source configured to illuminate a scene during a plurality of consecutive time frames; a structured light source configured to illuminate the scene concurrently with the illumination of the scene by the unstructured light source, the illumination by the structured light source occurring during predetermined frames of the plurality of consecutive time frames; an array of photodetectors comprising a plurality of photodetector elements; and a processing resource configured to calculate a range; wherein the array of photodiodes is configured to generate a plurality of sets of signals in response to irradiation with light reflected from the scene, the plurality of sets of signals comprising a set of signals generated substantially contemporaneously by each photodetector element of the plurality of photodiodes elements in accordance with an indirect time of flight measurement technique; the processing resource is configured to derive an error estimate from the plurality of sets of signals generated during a selected time frame of the plurality of consecutive time frames and another time frame temporally about the selected time frame, illumination by the unstructured light source occurring during the selected time frame and illumination by both the structured and unstructured light sources occurring during the another time frame; and the processing resource is configured to apply the error estimate in a range calculation with respect to the scene.

According to a third aspect of the present invention, there is provided a method for multipath error compensation for an indirect time of flight range calculation apparatus, the method comprising: illuminating a scene during a plurality of consecutive time frames with unstructured light; illuminating the scene with structured light concurrently with the unstructured illumination of the scene, the structured illumination occurring during predetermined frames of the plurality of consecutive time frames; generating a plurality of sets of signals in response to irradiation with light reflected from the scene in accordance with an indirect time of flight measurement technique; deriving an error estimate from the plurality of sets of signals generated during a selected time frame of the plurality of consecutive time frames and another time frame temporally about the selected time frame, illumination by the unstructured light source occurring during the selected time frame and illumination by both the structured and unstructured light occurring during the another time frame; and applying the error estimate in a range calculation with respect to the scene.

It is thus possible to provide an apparatus and method capable of obviating or at least mitigating multipath effects in an indirect time of flight range calculation system whilst mitigating the penalty of a reduction in the distance frame rate that usually accompanies illumination with different structured light patterns.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
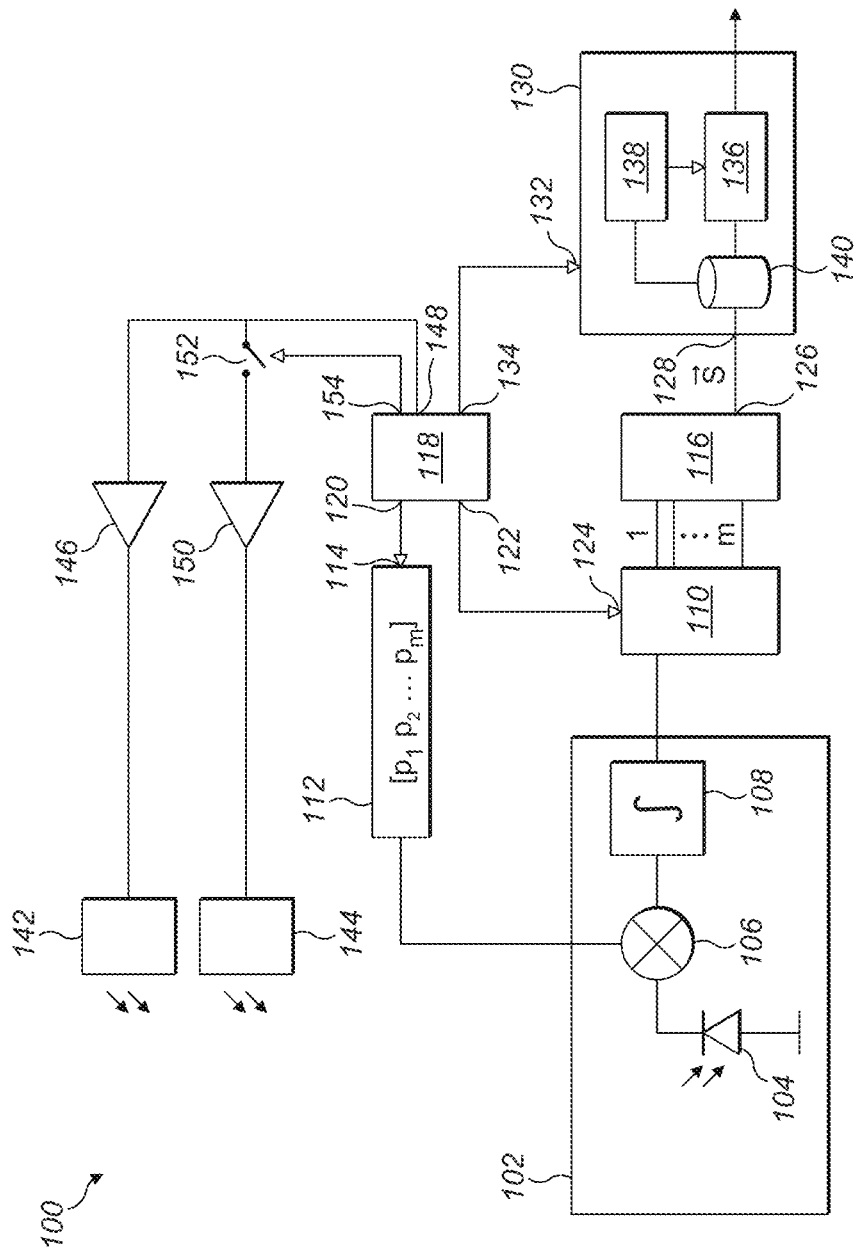
FIG. 1 is a schematic diagram of a multipath error-compensated indirect time of flight range calculation apparatus constituting an embodiment of the invention.

Throughout the following description, identical reference numerals will be used to identify like parts.

Referring to FIG. 1, a first indirect time of flight range calculation apparatus 100 comprises a detection and ranging module comprising an optical receiver photonic mixer pixel device 102 constituting a photodetector element, the optical receiver photonic mixer pixel device 102 comprising a photodiode 104 having an anode operably coupled to ground potential or other predetermined voltage and a cathode coupled a first input of a photonic mixer 106, an output of the photonic mixer 106 being coupled to an input of an integrator 108. In this example, a single photonic mixer pixel device 102 is being described for the sake of conciseness and clarity of description. However, the skilled person will appreciate that the detection and ranging module comprises an array of photonic mixer pixel devices of the kind described above. An output of the integrator 108 is coupled to an input of a phase buffer 110 having a plurality of parallel outputs, representing respective accumulated charge levels for applied phase values in respect of the photonic mixer pixel device 102. In this example, the phase buffer 110 comprises m outputs, one in respect of each applied phase value.

The skilled person should appreciate that, as the output of the integrator 108 is an accumulated charge and, in this example in the analogue domain, the output of the integrator 108 needs to be converted to the digital domain before processing downstream of the phase buffer 110. This can be achieved, for example, by employing a photon counter as the integrator 108 or providing an analogue-to-digital converter before or after the phase buffer 110.

A phase signal generator 112 is configured to generate a continuous wave electrical signal. The phase of the continuous wave signal is selectable via a control input 114, the phase of the continuous wave signal being selectable from a set of phases: [$p_1, p_2, \ldots, p_m$]. An output of the phase signal generator 112 is coupled to a second input of photonic mixer 106.

The apparatus also comprises a timing control unit 118 having a first control output 120 coupled to the control input 114 of the phase signal generator 112, and a synchronisation output 122 operably coupled to a timing input 124 of the phase buffer 110.

The plurality, m, of outputs of the phase buffer 110 are respectively coupled to a plurality of parallel inputs of a Digital Fourier Transform (DFT) unit 116. The DFT unit 116 has a plurality of digital in-phase (I)/quadrature (Q) outputs, which correspond to b pairs of digital I/Q outputs (not shown) in respect of different harmonics of measured signals.

A pair of I/Q outputs 126, relating to the first harmonic of received reflected optical signals, is coupled to a vector input 128 of a range calculation unit 130. The range calculation unit 130 has a multipath calculation control port 132 operably coupled to a second control output 134 of the timing control unit 118. The vector input 128 of the range calculation unit 130 is operably coupled to a vector buffer 140, the vector buffer 140 also being operably coupled to a vector-to-range calculation unit 136. The vector buffer 140 of the range calculation unit 130 is also operably coupled to a multipath calculation unit 138. In this example, the vector-to-range calculation unit 136 comprises a phase angle calculation unit, for example an arctan unit for employing an arctan 2 technique to calculate the phase angle. However, the skilled person will appreciate that other techniques can be employed to calculate the phase angle, for example a triangular technique. Optionally, the vector-to-range calculation unit 136 can comprise an amplitude calculation unit employing, for example a taxicab norm L1 or Euclidean norm L2 calculation technique.

The apparatus 100 also comprises a first source of electromagnetic radiation, for example a Laser Diode (LD) or a Light Emitting Diode (LED), hereinafter referred to as a first optical source 142, and a second source of electromagnetic radiation, for example an LD or an LED, hereinafter referred to as a second optical source 144, sharing in this example a substantially common field-of-illumination. In this example, the first and second optical sources 142, 144 are configured to emit infrared light that is amplitude modulated in accordance with an indirect time of flight measurement technique so as to be emitted respectively as first and second continuous wave optical signals when driven. In this regard, a first driver circuit 146 has a first input operably coupled to a trigger signal output 148 of the timing control unit 118 and a second driver circuit 150 has a second input operably also coupled to the trigger signal output 148 of the timing control unit 118, but via an activation controller 152, for example a switching circuit. The activation controller 152 has a control input operably coupled to a source selection output 154 of the timing control unit 118. A first output of the first driver circuit 146 is coupled to a first drive input of the first optical source 142, and a second output of the second driver circuit 150 is coupled to a second drive input of the second optical source 144. In this example, the first optical source 142 is configured to emit a uniform emission, i.e. unpatterned, of light, and the second optical source 144 is configured to emit structured light, for example a predetermined pattern of light as will now be described in further detail later herein.

Figure 2:
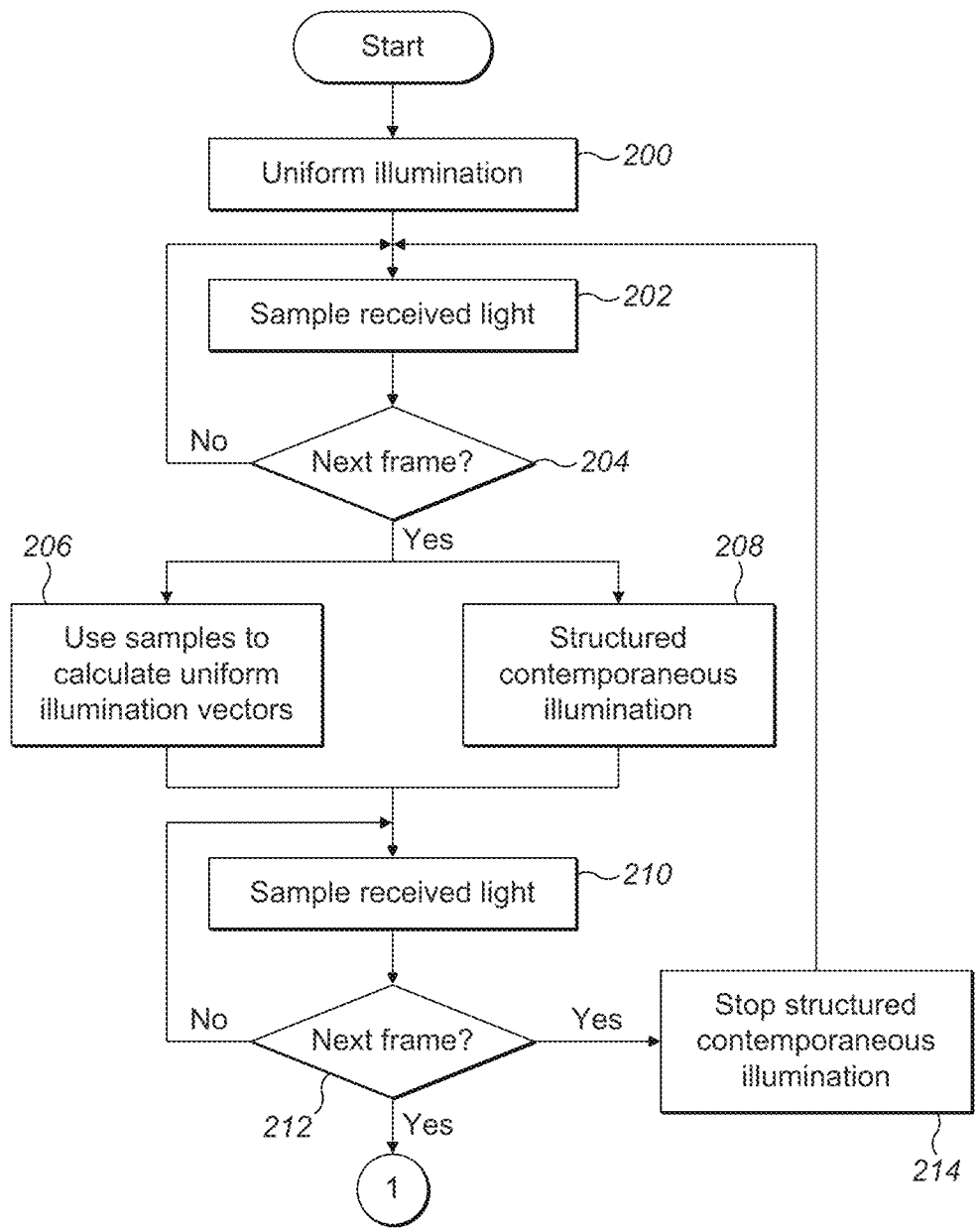
FIG. 2 is a flow diagram of a first part of a method for multipath error compensation for the indirect time of flight range calculation apparatus of FIG. 1 and constituting another embodiment of the invention.
Figure 3:
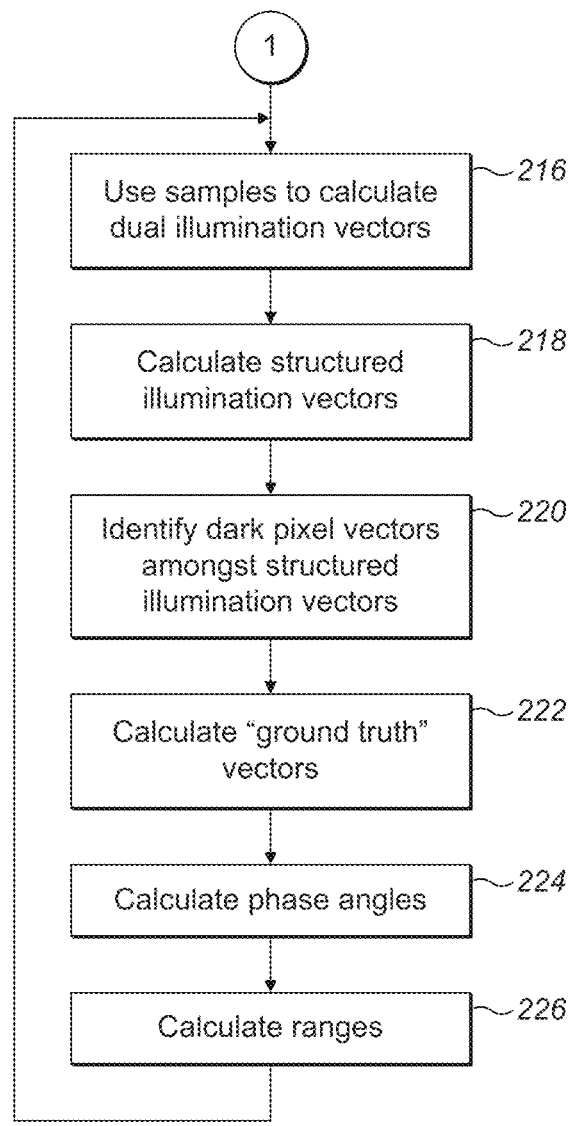
FIG. 3 is a flow diagram of a second part of the method of FIG. 2.

In operation (FIGS. 2 and 3), following powering-up and at the beginning of a measurement time frame, constituting a selected time frame of a plurality of consecutive time frames, the timing control unit 118 ensures that the second optical source 114 is not active, i.e. not receiving trigger signals, and the first optical source 142 is receiving trigger signals. The first optical source 142 therefore emits a first uniform continuous wave optical signal that illuminates (Step 200) a scene, for example the whole of the scene. In this regard, the first optical source 142 is a source of unstructured light. An object in the scene, for example, reflects the emitted first optical signal. The first optical source 142 illuminates the scene during a plurality of consecutive time frames. During the measurement time frame of the plurality of consecutive time frames, the phase signal generator 112 generates a continuous wave electrical signal, the timing control unit 118 controlling cycling through the set of phases in respect of the electrical signal relative to the continuous wave first optical signal. A synchronisation signal is also applied by timing control unit 118 to the frame buffer unit 110 to ensure transfer of complete sets of signals to the DFT unit 116. A multipath calculation activation signal is also provided by the timing control unit 118 via the multipath calculation control port 132, to the range calculation unit 130 to calculate a compensated vector. This can be achieved, for example, by setting a flag that the multipath calculation unit 138 and the vector-to-range calculation unit 136 monitor.

The electrical signal generated by the phase signal generator 112 is applied to the photonic mixer 106 and the phase angle of the electrical signal is cycled through the set of phase angles mentioned above during the measurement time frame and digital representations of the charges stored in the integrator 108 in respect of each phase angle of the set of phase angles are received by the frame buffer 110 in series (Steps 202 and 204). In this respect, the integrator 108 provides a plurality of phase angle sample outputs in series representing respective accumulated charge levels for applied phase angle values in respect of the photonic mixer pixel device 102. The phase buffer 110 effectively performs a serial-to-parallel conversion of the electrical measurement signals originating from the integrator 108 once a set of phase angles has been cycled through and then provides m parallel output signals to the DFT unit 116.

A subsequent measurement time frame, constituting another time frame temporally about the selected time frame, follows the measurement time frame, during which in response to receipt of the m output signals, the DFT unit 116 generates (Step 206) a pair of I/Q output signals at the I/Q output 126 constituting a uniform illumination vector, $S_{uniform}$, in respect of the fundamental frequency and having a first phase angle. The I/Q output signal is received by the range calculation unit 130 and stored temporarily in the vector buffer 140 pending the receipt of another pair of I/Q output signals in respect of the subsequent measurement time frame.

Figure 4:
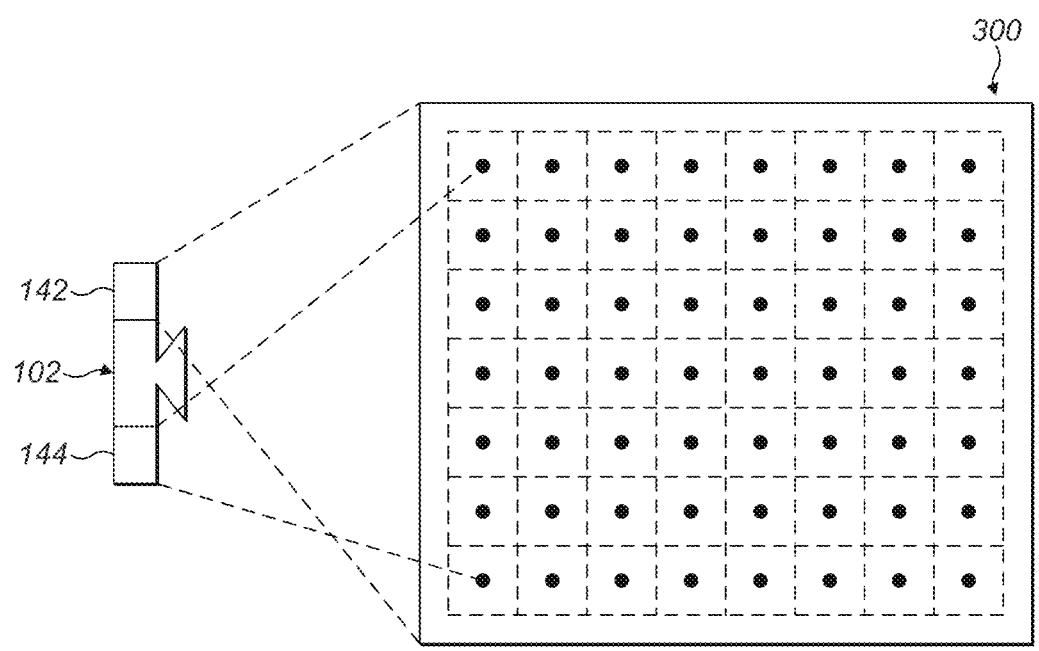
FIG. 4 is a schematic diagram of an illumination arrangement of FIG. 1 constituting a further embodiment of the invention.

Additionally, upon commencement of the subsequent measurement time frame, the timing control unit 118 instructs the activation controller 152 to permit the second driver circuit 150 to receive the trigger signals in order to drive the second optical source 144, which as mentioned above is configured to emit a structured light pattern. Referring to FIG. 4, the second optical source 144 projects a high spatial frequency low intensity illumination pattern, for example a dot pattern generated by a Vertical Cavity Surface Emitting Laser (VCSEL) array placed in the focal plane of a lens, or a checkerboard pattern. In this respect, the second optical source 144 employs an illumination pattern comprising regions of no illumination.

The structured light pattern is emitted (Step 208) contemporaneously with the uniform (non-structured) emission of light by the first optical source 142 during the subsequent measurement time frame and reflected by the object. It therefore follows that, in general terms, the second optical source 144 illuminates during predetermined frames of the plurality of consecutive time frames, which in this example are alternate time frames. However, the skilled person should appreciate that illumination by the second optical source 144 can, in other examples, occur after a predetermined number of time frames, repeatedly if required.

When the second optical source 144 is illuminating the scene, the phase signal generator 112 still generates the continuous wave electrical signal as described above in relation to illumination by the first optical source alone, the timing control unit 118 controlling cycling through the set of phases in respect of the electrical signal relative to the continuous wave first optical signal.

The electrical signal generated by the phase signal generator 112 is again applied to the photonic mixer 106 and the phase angle of the electrical signal is cycled through the set of phase angles mentioned above during the subsequent measurement time frame and digital representations of the charges stored in the integrator 108 in respect of each phase angle of the set of phase angles are received by the frame buffer 110 in series (Steps 210 and 212).

Once the subsequent measurement time frame has ended the timing control unit 118 prevents (Step 214) the second driver circuit 150 from being triggered, which ceases emission of the second optical signal by the second optical source 144. The above-described process of illuminating with only uniform light by the first optical source 142 followed by combined illumination by first and second optical sources 142, 144 is repeated (Steps 200 to 214) along with calculation of associated vectors for as long as required.

While another measurement time frame is elapsing, the phase buffer 110 again performs a serial-to-parallel conversion of the electrical measurement signals originating from the integrator 108 and provides the m parallel output signals to the DFT unit 116. Using the m parallel output signals, the DFT unit 116 generates (Step 216) a subsequent pair of I/Q output signals constituting a combined illumination vector, $\vec{S}_{both}$, in respect of the fundamental frequency and having a second phase angle. The subsequent I/Q output signal of the combined illumination vector, $\vec{S}_{both}$, is received by the range calculation unit 130 and also stored in the vector buffer 140.

The above method is performed in relation to a plurality of pixels comprising the optical receiver photonic mixer pixel device 102 mention above. In this respect, in order to more clearly understand the operation of the apparatus 100 from this stage of the method of operation onwards, the processing is now described in relation to processing output signals in respect of uniform illumination vectors, $\vec{S}_{uniform}$, and combined illumination vectors, $\vec{S}_{both}$, generated in respect of the plurality of pixels comprising the pixel 102, for example an array of pixels. In this regard, each pixel 102 outputs a plurality of phase angle sample outputs, substantially in synchronism with the illumination of the scene by the second optical source 144 and/or the first optical source 142. The plurality of pixels generate a plurality of sets of signals substantially contemporaneously and the DFT unit 116 substantially contemporaneously generate the uniform illumination vectors, $\vec{S}_{uniform}$, and the combined illumination vectors, $\vec{S}_{both}$, at the appropriate times as already described above.

Whilst measurement time frames are elapsing, the range calculation unit 130 operates as follows. Upon receipt the subsequent pairs of I/Q output signals of the combined illumination vectors, $\vec{S}_{both}$, and in response to the instruction sent by the timing control unit 118 to calculate and compensate for multipath errors, the multipath calculation unit 138 accesses the uniform illumination vectors, $\vec{S}_{uniform}$, and the combined illumination vectors, $\vec{S}_{both}$, in respect of substantially each pixel stored in the vector buffer 140 to calculate (Step 218) structured illumination vectors, $\vec{S}_{structured}$, in respect of the second optical signal emitted by the second optical source 144:

$$\vec{S}_{structured} = \vec{S}_{both} - \vec{S}_{uniform} \qquad (4)$$

Hence, in general terms, it can be seen that a difference image frame is calculated between an image frame in respect of the plurality of sets of signals of the selected time frame (the measurement time frame in this example) and an image frame in respect of the plurality of sets of signals of the another time frame (the subsequent measurement time frame in this example).

From the structured illumination vectors, the multipath calculation unit 138 uses a priori knowledge of the pattern of the structured illumination of the second optical signal in order to identify (Step 220) non-illuminated areas of the pattern. For those areas corresponding to non-illuminated areas of the pattern of the structured illumination of the second optical signal, $\vec{S}_{structured\ dark}$, a function, f, for example a function that performs interpolation, can be employed in order to estimate reflected light received and attributable to multipath effects for the non-illuminated regions, $\vec{S}_{mp}$:

$$\vec{S}_{mp} = f(\vec{S}_{structured\ dark}) \qquad (5)$$

In this example, estimation of the reflected light in respect of the non-illuminated areas of the pattern is by way of a low pass filtering operation, which is performed by the multipath calculation unit 138. This constitutes a derivation of an error estimate, $\vec{S}_{mp}$, which is derived using regions (of the difference calculated in equation (4) above) that correspond to regions of no illumination of the illumination pattern of the second optical source 144. Measurements of this difference image frame corresponding to the regions of no illumination are stored. Using the vectors corresponding to the identified non-illuminated areas of the pattern, the multipath calculation unit 138 uses the function (in this example the low-pass filtering function) to determine the error estimate for all vectors of the difference image frame and then to calculate (Step 222) "ground truth" vectors, $\vec{S}_{gt}$, representing the measured reflection from the object after compensation for estimated multipath errors:

$$\vec{S}_{gt} = \vec{S}_{uniform} - k \cdot f(\vec{S}_{mp}) \qquad (6)$$

where k is a scaling constant defined by the optical power ratio between the first optical source 142 emitting the uniform optical signal and the second optical source 144 emitting the structured optical signal, and $f(\vec{S}_{mp})$ is the calculated multipath error estimate across all the vectors of the difference image frame. The ground truth vectors, or corrected vectors, $\vec{S}_{gt}$, are stored in the vector buffer 140.

The error compensation vector $k \cdot f(\vec{S}_{mp})$ can be applied to both uniform illumination vectors, $\vec{S}_{uniform}$, and combined illumination vector $\vec{S}_{both}$. Thereafter, the compensated vectors calculated, i.e. the ground truth vectors, $\vec{S}_{gt}$, are accessed by the vector-to-range calculation unit 136 and, in this example, the arctan unit of the vector-to-range calculation unit 136 calculates (Step 224) a phase angle defined by the ground truth vector, $\vec{S}_{gt}$, and thereafter a time of flight (Step 226) from the phase angle calculated using the indirect time of flight measurement technique and a predetermined scaling factor to translate the phase angle calculated to the time of flight. From the calculated time of flight, a range to the object is calculated.

The above steps (Steps 216 to 226) are repeated until generation of compensated measured ranges is no longer required. Consequently, the error estimates are, in this example, updated as required using the plurality of sets of signals generated during a selected time frame of the plurality of consecutive time frames subsequent to the subsequent measurement time frame, and using the plurality of sets of signals generated during a further time frame temporally about the subsequent selected time frame, illumination by the first optical source 142 occurring during the subsequent selected time frame and illumination by both the first and second optical sources 142, 144 occurring during the further time frame.

The skilled person should appreciate that the above-described implementations are merely examples of the various implementations that are conceivable within the scope of the appended claims. Indeed, it should be appreciated that, for example, in other embodiments, the phase buffer 110 and hence parallel processing of the buffered phase measurements obtained from the photonic mixer pixel device 102 in series can be omitted. In such embodiments, serial transfer of the phase measurements can be directly to the DFT unit 116, thereby reducing memory requirements for the detection and ranging module. In this respect, the DFT unit 116 can be provided with smaller internal buffers to calculate iteratively, for each frame cycle, intermediate I and Q values for the respective phase measurements received in series, which are accumulated over the frame cycle to generate final I and Q value results. In order to support this arrangement, the DFT unit 116 can be operably coupled to the timing control unit 118 to maintain synchronisation of data processing.

In the above examples, the first optical source 142 illuminates uniformly over every measurement time frame and the second optical source 144 projects a high spatial frequency illumination pattern every other frame. In other examples, a further optical source can be employed to project another pattern, for example a complementary pattern to the second optical source 144, to improve the multipath error compensation accuracy further, this additional pattern being emitted during a different time frame to the illumination projected by the second optical source 144, but contemporaneously with the uniform illumination by the first optical source 142. In this regard, and in general terms, the illumination by the further optical source can occur during further predetermined frames of the plurality of consecutive time frames that are different from the predetermined frame mentioned above. In such an example, a plurality of sets of signals can be generated respectively by the pixels during the further predetermined frames and the error estimate can be derived by using the plurality of sets of signals generated during another selected time frame of the further predetermined frames, illumination by the further optical source occurring during the another selected time frame. In such an example, it should be appreciate that the structured light pattern emitted by the second optical source 144 is different from a further structured light pattern emitted by the further optical source.

The above examples describe the generation of the plurality of uniform illumination vectors, $\vec{S}_{uniform}$, substantially contemporaneously during the measurement time frame, which can be understood to have been a selected time frame of the plurality of consecutive time frames for the purpose of making a measurement. The plurality of combined illumination vectors, $\vec{S}_{both}$, are then generated in respect of the subsequent measurement time frame, which occurs immediately after the selected time frame. However, more generally and as already suggested above, the plurality of combined illumination vectors, $\vec{S}_{both}$, an be generated in respect of another time frame temporally about the selected time frame, illumination by the unstructured light source occurring during the selected time frame and illumination by both the structured and unstructured light sources occurring during the another time frame. In this regard, the generation of the plurality of combined illumination vectors, $\vec{S}_{both}$, does not have to take place immediately preceding or following the selected time frame and a larger number of time frames can be allowed, in some examples, to elapse after the selected time frame before the plurality of combined illumination vectors, $\vec{S}_{both}$, is generated, and/or a larger number of time frames can be allowed to elapse following the generation of the plurality of combined illumination vectors, $\vec{S}_{both}$, before the plurality of uniform illumination vectors, $\vec{S}_{uniform}$, is generated. It can therefore be seen that predetermined time frames during which the second optical source 144 illuminates the scene can be non-consecutive. Furthermore, the non-consecutive time frames can be regularly spaced in time.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:

1. A method for multipath error compensation for an indirect time of flight range calculation apparatus, the method comprising:
    an unstructured light source illuminating a scene during a plurality of consecutive time frames;
    a structured light source illuminating the scene concurrently with the illumination of the scene by the unstructured light source, the illumination by the structured light source occurring during predetermined frames of the plurality of consecutive time frames;

an array of photodetectors generating a plurality of sets of signals in response to irradiation with light reflected from the scene, the plurality of sets of signals comprising a set of signals generated substantially contemporaneously by each photodetector element of the array of photodiodes in accordance with an indirect time of flight measurement technique;

deriving an error estimate from the plurality of sets of signals generated during a selected time frame of the plurality of consecutive time frames and another time frame temporally about the selected time frame, illumination by the unstructured light source occurring during the selected time frame and illumination by both the structured and unstructured light sources occurring during the another time frame; and applying the error estimate in a range calculation with respect to the scene.

2. The method according to claim 1, further comprising:
updating the error estimate using the plurality of sets of signals generated during a subsequent selected frame of the plurality of consecutive time frames and a further time frame temporally about the subsequent selected time frame, illumination by the unstructured light source occurring during the subsequent selected time frame and illumination by both the structured and unstructured light sources occurring during the further time frame.

3. The method according to claim 1, wherein the predetermined time of the plurality of consecutive time frames are non-consecutive.

4. The method according to claim 3, wherein the non-consecutive predetermined frames are regularly spaced in time.

5. The method according to claim 1, further comprising:
deriving the error estimate by calculating a difference between respective measurements corresponding to the plurality of sets of signals of the selected time frame and respective measurements corresponding to the plurality of sets of signals of the another time frame.

6. The method according to claim 5, wherein:
calculating the difference comprises calculating a difference image frame between an image frame in respect of the plurality of sets of signals of the selected time frame and an image frame in respect of the plurality of sets of signals of the another time frame.

7. The method according to claim 5, wherein
the structured light source employs an illumination pattern comprising regions of no illumination; and
the error estimate is derived in respect of the regions of no illumination.

8. The method according to claim 7, wherein
the error estimate is derived using regions of the difference calculated corresponding to regions of no illumination of the illumination pattern of the structured light source.

9. The method according to claim 6, wherein
the structured light source employs an illumination pattern comprising regions of no illumination; and
the error estimate is derived in respect of the regions of no illumination.

10. The method according to claim 9, further comprising:
storing measurements of the difference image frame corresponding to the regions of no illumination.

11. The method according to claim 1, wherein the first unstructured light source and the structured light source share a substantially common field-of-illumination.

12. The method according to claim 1, wherein the unstructured light source emits a uniform pattern of illumination.

13. The method according to claim 10, wherein the difference calculated comprises error measurements in respect of the regions of no illumination of the illumination pattern of the structured light source; and
derivation of the error estimate comprises:
interpolating using the measurements corresponding to the regions of no illumination of the illumination pattern of the structured light source in order to obtain error measurements in respect of regions of illumination of the illumination pattern of the structured light source.

14. The method according to claim 1, further comprising:
another structured light source illuminating the scene concurrently with the illumination of the scene by the unstructured light source, the illumination by the another structured light source occurring during further predetermined time frames of the plurality of consecutive time frames different from the predetermined time frame; and
derivation of the error estimate further comprises employing the plurality of sets of signals generated during another selected time frame of the further predetermined time frames, illumination by the another unstructured light source occurring during the another selected time frame.

15. The method according to claim 1, wherein
the structured light source employs an illumination pattern comprising regions of no illumination; and
the error estimate is derived in respect of the regions of no illumination.

16. The method according to claim 15, further comprising:
scaling measurements of the calculated difference in respect of the regions of no illumination.

17. A multipath error-compensated indirect time of flight range calculation apparatus comprising:
an unstructured light source configured to illuminate a scene during a plurality of consecutive time frames;
a structured light source configured to illuminate the scene concurrently with the illumination of the scene by the unstructured light source, the illumination by the structured light source occurring during predetermined frames of the plurality of consecutive time frames;
an array of photodetectors comprising a plurality of photodetector elements; and
a processing resource configured to calculate a range; wherein
the array of photodiodes is configured to generate a plurality of sets of signals in response to irradiation with light reflected from the scene, the plurality of sets of signals comprising a set of signals generated substantially contemporaneously by each photodetector element of the plurality of photodiodes elements in accordance with an indirect time of flight measurement technique;
the processing resource is configured to derive an error estimate from the plurality of sets of signals generated during a selected time frame of the plurality of consecutive time frames and another time frame temporally about the selected time frame, illumination by the unstructured light source occurring during the selected time frame and illumination by both the structured and unstructured light sources occurring during the another time frame; and the processing resource is configured to apply the error estimate in a range calculation with respect to the scene.

18. The apparatus according to claim 17, further comprising:
the processing resource updating the error estimate using the plurality of sets of signals generated during a subsequent selected frame of the plurality of consecutive time frames and a further time frame temporally about the subsequent selected time frame, illumination by the unstructured light source occurring during the subsequent selected time frame and illumination by both the structured and unstructured light sources occurring during the further time frame.

19. The apparatus according to claim 17, further comprising:
the processing resource deriving the error estimate by calculating a difference between respective measurements corresponding to the plurality of sets of signals of the selected time frame and respective measurements corresponding to the plurality of sets of signals of the another time frame.

20. The apparatus according to claim 19, wherein:
the processing resource calculating the difference comprises calculating a difference image frame between an image frame in respect of the plurality of sets of signals of the selected time frame and an image frame in respect of the plurality of sets of signals of the another time frame.

* * * * *